United States Patent
Browne et al.

(10) Patent No.: US 8,540,297 B2
(45) Date of Patent: Sep. 24, 2013

(54) MANIPULATING CENTER CONSOLE COMPONENTS UTILIZING ACTIVE MATERIAL ACTUATION

(75) Inventors: Alan L. Browne, Grosse Pointe, MI (US); Matthew Edward Gedris, Royal Oak, MI (US); Nancy L. Johnson, Northville, MI (US); Paul W. Alexander, Ypsilanti, MI (US); John Thomas Goscicki, Sterling Heights, MI (US); James Holbrook Brown, Costa Mesa, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 439 days.

(21) Appl. No.: 12/558,515

(22) Filed: Sep. 12, 2009

(65) Prior Publication Data

US 2010/0066113 A1    Mar. 18, 2010

Related U.S. Application Data

(60) Provisional application No. 61/096,861, filed on Sep. 15, 2008.

(51) Int. Cl.
*B60R 7/04* (2006.01)
(52) U.S. Cl.
USPC ..................................... 296/24.34; 296/37.8

(58) Field of Classification Search
USPC .................. 296/24.34, 37.8; 297/188.19
See application file for complete search history.

(56) References Cited

U.S. PATENT DOCUMENTS

| | | | | |
|---|---|---|---|---|
| 5,732,994 | A * | 3/1998 | Stancu et al. | 296/37.8 |
| 7,032,282 | B2 * | 4/2006 | Powell et al. | 29/426.4 |
| 2004/0074062 | A1 * | 4/2004 | Stanford et al. | 24/442 |
| 2005/0000065 | A1 * | 1/2005 | Browne et al. | 24/442 |
| 2005/0198774 | A1 * | 9/2005 | Henry et al. | 16/71 |
| 2005/0198777 | A1 * | 9/2005 | Mabe | 16/308 |
| 2005/0206175 | A1 * | 9/2005 | Browne et al. | 292/253 |
| 2005/0212304 | A1 * | 9/2005 | Herrera et al. | 292/251.5 |
| 2005/0275243 | A1 * | 12/2005 | Browne et al. | 296/146.9 |
| 2006/0261109 | A1 * | 11/2006 | Browne et al. | 224/309 |
| 2008/0100079 | A1 * | 5/2008 | Herrera et al. | 296/37.1 |
| 2008/0104796 | A1 * | 5/2008 | Henry et al. | 16/71 |
| 2008/0217927 | A1 * | 9/2008 | Browne et al. | 292/28 |
| 2009/0106938 | A1 * | 4/2009 | Mori | 16/277 |
| 2010/0237632 | A1 * | 9/2010 | Browne et al. | 292/201 |
| 2011/0215606 | A1 * | 9/2011 | Trivedi | 296/24.34 |

FOREIGN PATENT DOCUMENTS

JP    2000-272426 A *    3/2012

* cited by examiner

*Primary Examiner* — Jason S Morrow

(57) ABSTRACT

A center console comprising a manipulable structural component, such as a pivotal lid, sliding armrest, tambour door, or pivotal cup holder, and at least one active material actuator including an active material element operable to undergo a reversible change, drivenly coupled to the component, and configured to autonomously cause and/or enable the component to be manipulated as a result of the change.

7 Claims, 7 Drawing Sheets

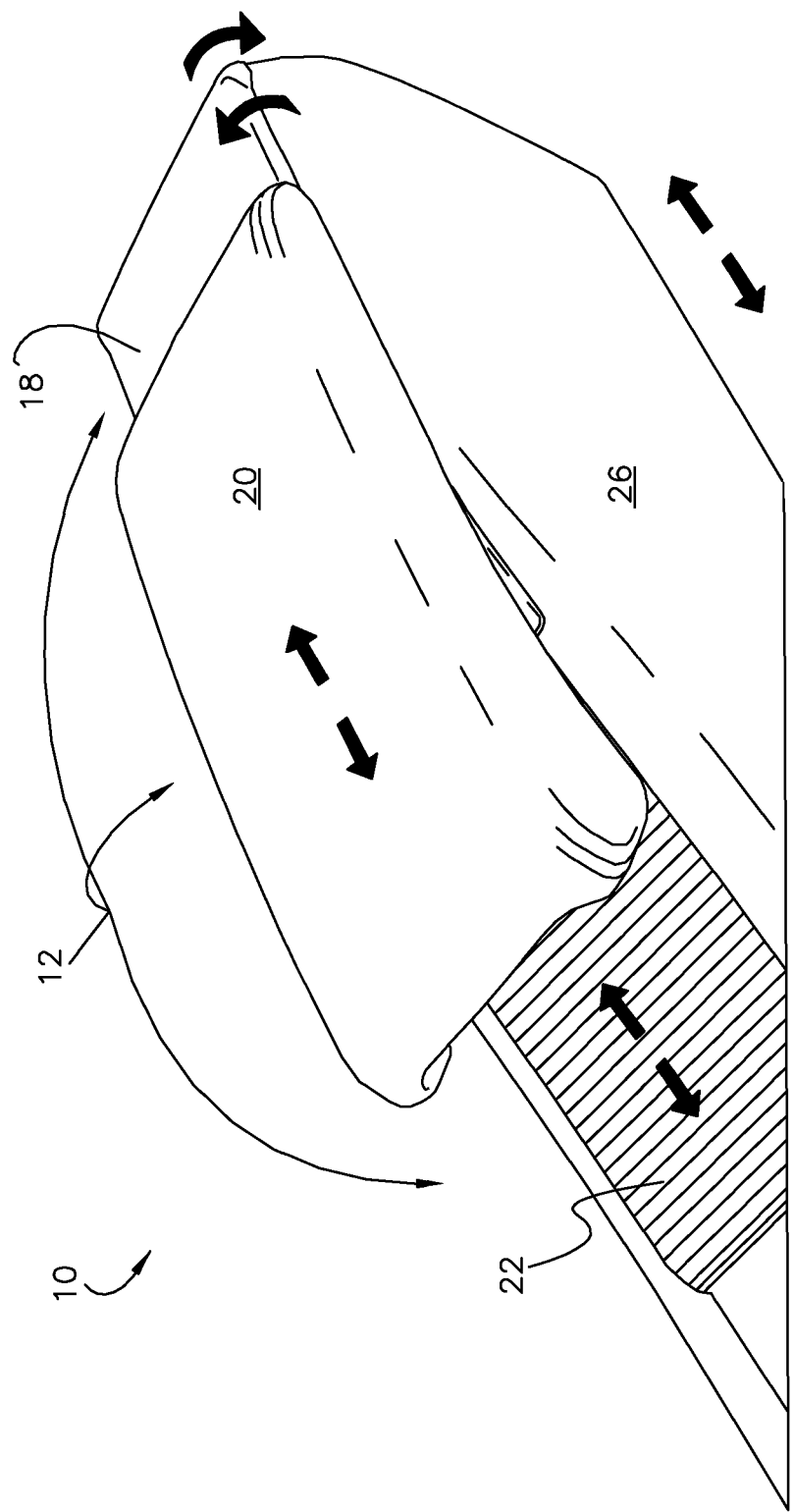

US 8,540,297 B2

MANIPULATING CENTER CONSOLE COMPONENTS UTILIZING ACTIVE MATERIAL ACTUATION

RELATED APPLICATIONS

This patent application claims priority to and benefit from U.S. Provisional Patent Application Ser. No. 61/096,861, entitled "CENTER CONSOLE UTILIZING ACTIVE MATERIAL ACTUATION," and filed on Sep. 15, 2008, the disclosure of which is incorporated by reference herein.

BACKGROUND OF THE INVENTION

1. Field of the Invention

The present disclosure generally relates to center consoles having manipulable components, and in particular, to a center console that utilizes active material actuation to manipulate at least one component.

2. Discussion of the Prior Art

Center consoles, such as those used in automotive vehicles, typically comprise a number of manipulable and/or reconfigurable components that provide increased comfort and functionality for an adjacently seated occupant(s). These components exemplarily include lids, storage compartment panels, and cup holders that selectively deploy and stow, and an armrest that slides in the fore-aft direction. Traditionally, these components have been manually manipulated, which presented and continues to present various concerns in the art. For example, it is appreciated that manual drives may present a distraction from operating the vehicle, often require complex physical motion and dexterity that is difficult for some users to perform, and are prone to the application of an improper actuation force and resultant damage. As a result, mechanically driven components that utilize such actuators as motors, solenoids, and the like, have been increasingly introduced to provide autonomous manipulation. These types of actuators, however, also present concerns in the art, including, for example, the addition of bulky mechanical devices that take up packaging space, add an otherwise undesirable amount of mass, and generate acoustic and electromagnetic field noise.

BRIEF SUMMARY OF THE INVENTION

Responsive to these and others concerns, the present invention recites a center console that utilizes active material actuation to manipulate at least one component. As such, the invention is useful for providing autonomous functionality, either on-demand or in response to sensory feedback, while increasing packaging space, reducing added mass, and reducing noise, in comparison to prior art mechanical actuators. The invention is further useful for providing a reconfigurable console that better accommodates users of varying dimensions.

In general, the inventive console is adapted for use with at least one adjacent seat, such as those found in transportation vehicles, and comprises at least one manipulable structural component and at least one active material actuator. The actuator(s) comprises an active material element that is operable to undergo a reversible change in a fundamental property when exposed to or occluded from an activation signal. The actuator is drivenly coupled to the component(s), so as to autonomously manipulate the component, and/or release a locking mechanism, so as to enable manual manipulation, as a result of the change. Exemplary components include a sliding armrest, pivotal cup holder, reconfigurable and translatable storage compartments, and articulating tambour doors.

The disclosure, including various configurations for implementation and features, such as locking mechanism, strain relief mechanism, and the use of stored energy elements, may be understood more readily by reference to the following detailed description of the various features of the disclosure and the examples included therein.

BRIEF DESCRIPTION OF THE SEVERAL VIEWS OF THE DRAWING

Preferred embodiments of the invention are described in detail below with reference to the attached drawing figures of exemplary scale, wherein:

FIG. 1a is a perspective view of a center console including various manipulable components driven by active material actuators, including a console lid, a console armrest, a tambour style door, and a storage compartment, in accordance with a preferred embodiment of the invention;

DETAILED DESCRIPTION OF THE PREFERRED EMBODIMENTS

Figure 1:
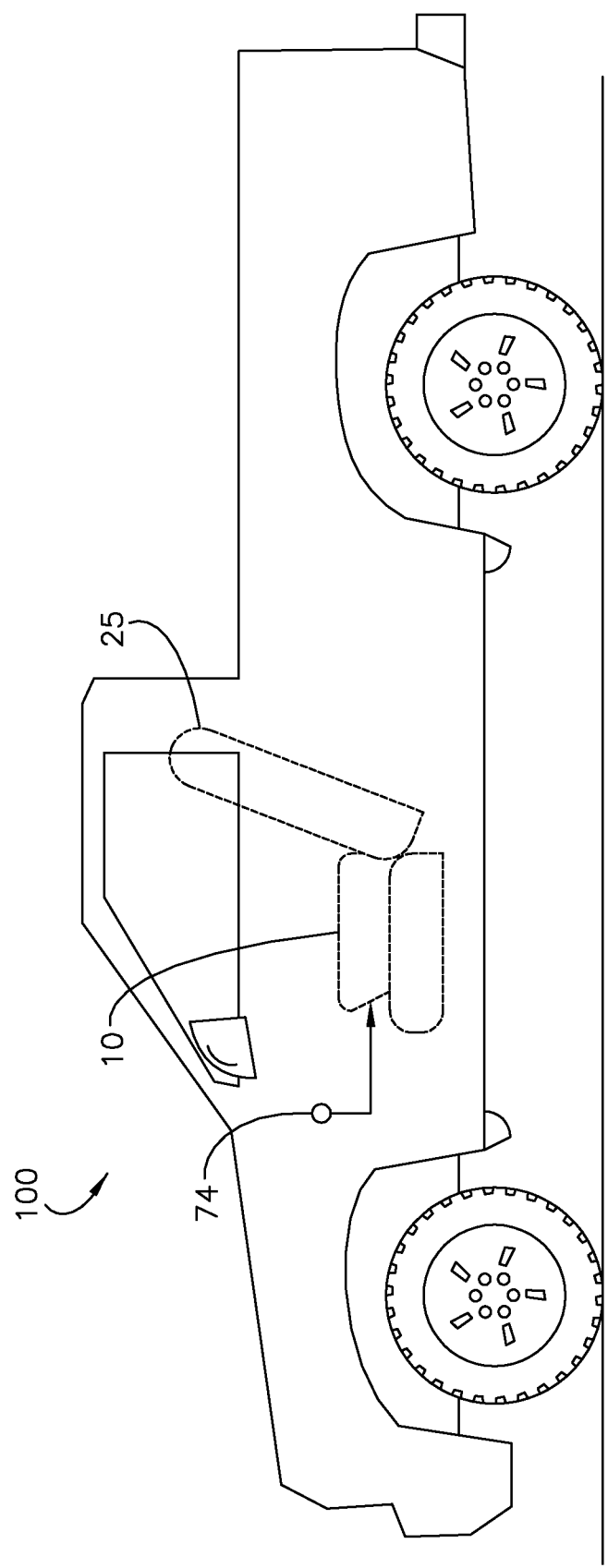
FIG. 1 is an elevation of a vehicle comprising a center console and input device/sensor communicatively coupled to the console, in accordance with a preferred embodiment of the invention.

Referring to FIGS. 1-5b, the present invention broadly concerns a center console 10 comprising at least one manipulable component 12 that is drivenly coupled to an active material actuator 14, i.e., an actuator consisting of and utilizing the force or displacement generated by at least one active material element 16, as further described herein. More preferably, the present invention presents a fully adjustable center console 10 that utilizes active material actuation to silently cause or enable the manipulation of a plurality of components 12. The preferred component 12 and actuator 14 are cooperatively configured such that the ability to manually manipulate the component 12 is retained, and as such, presents a manual override, where, for example, an electrical system failure (or otherwise inoperable activation source) is encountered. Exemplary components 12 include a pivotal console lid 18 (FIGS. 2-2*b*), a sliding armrest 20 (FIGS. 3*a*-*c*), a sliding tambour door 22 (FIG. 4), and a pivotal cup holder 24 (FIGS. 5*a,b*); however, it is certainly appreciated that other components, such as a translatable cup holder, a rollable top cover, and a reconfigurable interior compartment panel (not shown) may be employed as well. Furthermore, the console 10 itself may present a component 12, where the actuator 14 causes the console 10 in its entirety to be manipulated (e.g., translated).

It is appreciated that the term "center console", as used herein, shall be afforded its ordinary meaning as understood by those of ordinary skill in the art, and includes those furniture embodiments typically comprising at least a subset of the aforementioned components 12 and situated intermediate first and second seats 25 such as those found within transportation vehicles (e.g., automobiles, trucks, airplanes, boats, etc.) 100, as exemplarily presented in FIG. 1. The present invention improves upon the functionality and convenience provided by center consoles to seated occupants (not shown).

I. Active Material Discussion and Function

As used herein the term "active material" shall be afforded its ordinary meaning as understood by those of ordinary skill in the art, and includes any material or composite that exhibits a reversible change in a fundamental (e.g., chemical or intrinsic physical) property, when exposed to an external signal source. Thus, active materials shall include those compositions that can exhibit a change in stiffness properties, shape and/or dimensions in response to the activation signal, which can take the type for different active materials, of electrical, magnetic, thermal and like fields.

Suitable active materials for use with the present invention include but are not limited to shape memory materials such as shape memory alloys. Shape memory materials generally refer to materials or compositions that have the ability to remember their original at least one attribute such as shape, which can subsequently be recalled by applying an external stimulus. As such, deformation from the original shape is a temporary condition. In this manner, shape memory materials can change to the trained shape in response to an activation signal. Exemplary active materials include the afore-mentioned shape memory alloys (SMA), electroactive polymers (EAP), ferromagnetic SMA's, piezoelectric polymers, piezoelectric ceramics, electrostrictives, and magnetostrictives, various combinations of the foregoing materials, and the like.

More particularly, shape memory alloys (SMA's) generally refer to a group of metallic materials that demonstrate the ability to return to some previously defined shape or size when subjected to an appropriate thermal stimulus. Shape memory alloys are capable of undergoing phase transitions in which their yield strength, stiffness, dimension and/or shape are altered as a function of temperature. The term "yield strength" refers to the stress at which a material exhibits a specified deviation from proportionality of stress and strain. Generally, in the low temperature, or martensite phase, shape memory alloys can be plastically deformed and upon exposure to some higher temperature will transform to an austenite phase, or parent phase, returning to their shape prior to the deformation. Materials that exhibit this shape memory effect only upon heating are referred to as having one-way shape memory. Those materials that also exhibit shape memory upon re-cooling are referred to as having two-way shape memory behavior.

Shape memory alloys exist in several different temperature-dependent phases. The most commonly utilized of these phases are the so-called Martensite and Austenite phases discussed above. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature (As). The temperature at which this phenomenon is complete is called the austenite finish temperature (Af).

When the shape memory alloy is in the austenite phase and is cooled, it begins to change into the martensite phase, and the temperature at which this phenomenon starts is referred to as the martensite start temperature (Ms). The temperature at which austenite finishes transforming to martensite is called the martensite finish temperature (Mf). Generally, the shape memory alloys are softer and more easily deformable in their martensitic phase and are harder, stiffer, and/or more rigid in the austenitic phase. In view of the foregoing, a suitable activation signal for use with shape memory alloys is a thermal activation signal having a magnitude to cause transformations between the martensite and austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the martensite to austenite type transition, and the material will recover the original, annealed shape. Hence, one-way shape memory effects are only observed upon heating. Active materials comprising shape memory alloy compositions that exhibit one-way memory effects do not automatically reform, and will likely require an external mechanical force to reform the shape.

Intrinsic and extrinsic two-way shape memory materials are characterized by a shape transition both upon heating from the martensite phase to the austenite phase, as well as an additional shape transition upon cooling from the austenite phase back to the martensite phase. Active materials that exhibit an intrinsic shape memory effect are fabricated from a shape memory alloy composition that will cause the active materials to automatically reform themselves as a result of the above noted phase transformations. Intrinsic two-way shape memory behavior must be induced in the shape memory material through processing. Such procedures include extreme deformation of the material while in the martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active materials that exhibit the extrinsic two-way shape memory effects are composite or multi-component materials that combine a shape memory alloy composition that exhibits a one-way effect with another element that provides a restoring force to reform the original shape.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the system with shape memory effects, superelastic effects, and high damping capacity.

Suitable shape memory alloy materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

Thus, for the purposes of this invention, it is appreciated that SMA's exhibit a modulus increase of 2.5 times and a dimensional change of up to 8% (depending on the amount of pre-strain) when heated above their Martensite to Austenite phase transition temperature. It is appreciated that thermally induced SMA phase changes are one-way so that a biasing force return mechanism (such as a spring) would be required to return the SMA to its starting configuration once the applied field is removed. Joule heating can be used to make the entire system electronically controllable. Stress induced phase changes in SMA are, however, two way by nature. Application of sufficient stress when an SMA is in its Austenitic phase will cause it to change to its lower modulus Martensitic phase in which it can exhibit up to 8% of "superelastic" deformation. Removal of the applied stress will cause the SMA to switch back to its Austenitic phase in so doing recovering its starting shape and higher modulus.

Ferromagnetic SMA's (FSMA's), which are a sub-class of SMAs, may also be used in the present invention. These materials behave like conventional SMA materials that have a stress or thermally induced phase transformation between martensite and austenite. Additionally FSMA's are ferromagnetic and have strong magnetocrystalline anisotropy, which permit an external magnetic field to influence the orientation/fraction of field aligned martensitic variants. When the magnetic field is removed, the material may exhibit complete two-way, partial two-way or one-way shape memory. For partial or one-way shape memory, an external stimulus, temperature, magnetic field or stress may permit the material to return to its starting state. Perfect two-way shape memory may be used for proportional control with continuous power supplied. External magnetic fields are generally produced via soft-magnetic core electromagnets in automotive applications, though a pair of Helmholtz coils may also be used for fast response.

Suitable piezoelectric materials include, but are not intended to be limited to, inorganic compounds, organic compounds, and metals. With regard to organic materials, all of the polymeric materials with non-centrosymmetric structure and large dipole moment group(s) on the main chain or on the side-chain, or on both chains within the molecules, can be used as suitable candidates for the piezoelectric film. Exemplary polymers include, for example, but are not limited to, poly(sodium 4-styrenesulfonate), poly (poly(vinylamine) backbone azo chromophore), and their derivatives; polyfluorocarbons, including polyvinylidenefluoride, its co-polymer vinylidene fluoride ("VDF"), co-trifluoroethylene, and their derivatives; polychlorocarbons, including poly(vinyl chloride), polyvinylidene chloride, and their derivatives; polyacrylonitriles, and their derivatives; polycarboxylic acids, including poly(methacrylic acid), and their derivatives; polyureas, and their derivatives; polyurethanes, and their derivatives; bio-molecules such as poly-L-lactic acids and their derivatives, and cell membrane proteins, as well as phosphate bio-molecules such as phosphodilipids; polyanilines and their derivatives, and all of the derivatives of tetramines; polyamides including aromatic polyamides and polyimides, including Kapton and polyetherimide, and their derivatives; all of the membrane polymers; poly(N-vinyl pyrrolidone) (PVP) homopolymer, and its derivatives, and random PVP-co-vinyl acetate copolymers; and all of the aromatic polymers with dipole moment groups in the main-chain or side-chains, or in both the main-chain and the side-chains, and mixtures thereof.

Piezoelectric materials can also comprise metals selected from the group consisting of lead, antimony, manganese, tantalum, zirconium, niobium, lanthanum, platinum, palladium, nickel, tungsten, aluminum, strontium, titanium, barium, calcium, chromium, silver, iron, silicon, copper, alloys comprising at least one of the foregoing metals, and oxides comprising at least one of the foregoing metals. Suitable metal oxides include $SiO_2$, $Al_2O_3$, $ZrO_2$, $TiO_2$, $SrTiO_3$, $PbTiO_3$, $BaTiO_3$, $FeO_3$, $Fe_3O_4$, $ZnO$, and mixtures thereof and Group VIA and JIB compounds, such as CdSe, CdS, GaAs, $AgCaSe_2$, ZnSe, GaP, InP, ZnS, and mixtures thereof. Preferably, the piezoelectric material is selected from the group consisting of polyvinylidene fluoride, lead zirconate titanate, and barium titanate, and mixtures thereof.

Electroactive polymers include those polymeric materials that exhibit piezoelectric, pyroelectric, or electrostrictive properties in response to electrical or mechanical fields. An example of an electrostrictive-grafted elastomer with a piezoelectric poly(vinylidene fluoride-trifluoro-ethylene) copolymer. Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity—(for large or small deformations), a high dielectric constant, and the like. In one embodiment, the polymer is selected such that it has an elastic modulus at most about 100 MPa. In another embodiment, the polymer is selected such that it has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thickness suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

II. Exemplary Configurations and Applications

Figure 2A:
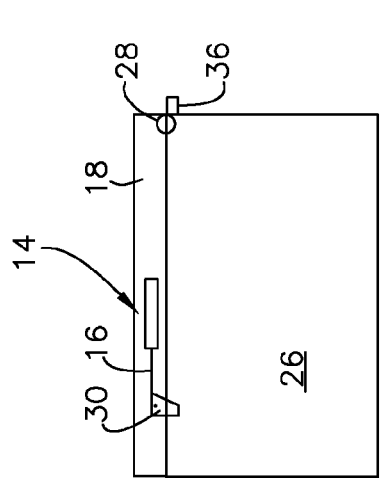
FIG. 2a is a side elevation of the console shown in FIG. 2, particularly illustrating the lid in a closed condition and an active material actuator drivenly coupled to laterally spaced pawls, such that when activated the pawls disengage the sides of the compartment and allow the lid to open.
Figure 2B:
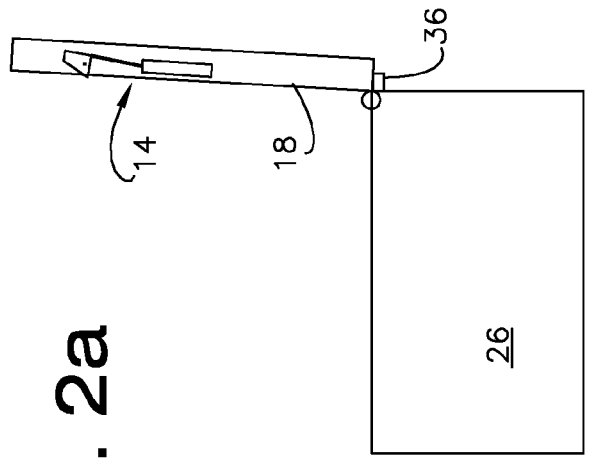
FIG. 2b is a side elevation of the console shown in FIGS. 2 and 2a, particularly illustrating the lid in an open condition.
Figure 2:
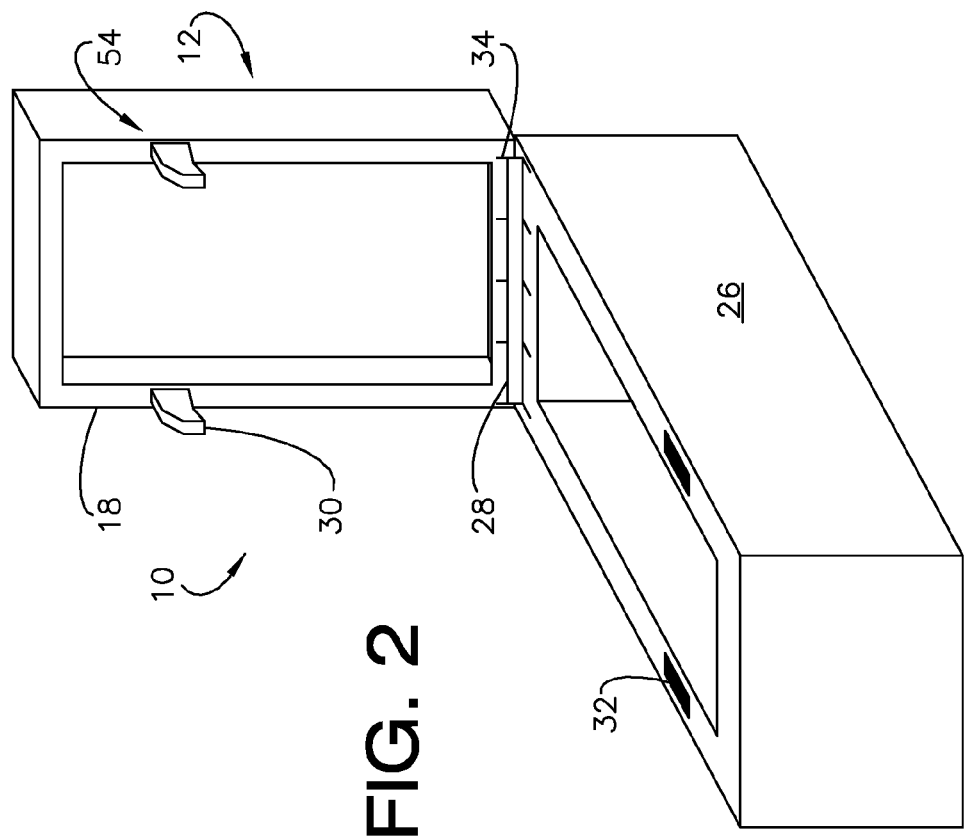
FIG. 2 is a perspective view of a console shown in an opened condition, and including a lid pivotally coupled to a storage compartment through a spring-biased hinge, in accordance with a preferred embodiment of the invention.

A preferred embodiment of the center console 10 is shown in FIGS. 2-2b, wherein a console lid 18 and armrest 20 are pivotally coupled to a storage compartment 26 by a hinge 28. The lid 18, armrest 20 and compartment 26 are depicted in rectangular configuration and of suitable dimension (e.g., length, depth, volume, etc.) for storing the intended objects (e.g., automotive accessories, purses, electronic devices, etc.) and supporting children/adult arms; however, it is appreciated that other geometric shapes may be equally presented. The armrest 20 preferably includes a compressible layer of material that is designed to comfortably support the arm of an occupant. The lid 18 and armrest 20 may be integrally formed; more preferably, however, and as shown in FIG. 1a, the armrest 20 is slidingly coupled to the lid 18.

Both the lid 18 and armrest 20 are caused or enabled to pivot, so as to selectively allow access to or cover a storage space defined by the compartment 26 by an active material actuator 14. For example, the lid 18 may be lockingly engaged with the compartment 26, through at least one spring-biased pawl (or pin) 30 configured to engage a corresponding number of catches 32 (FIGS. 2-2b), and released by an SMA wire 16. More preferably, the wire 16 is drivenly coupled to a linkage system (not shown) configured to ensure uniformity of disengagement by the pawls 30. The pawls 30 may be caused to pivot about an axis or translatably retract. Alternatively, the pawls 30 may be situated within the compartment 26 and the catches 32 defined by the lid 18 based on packing and aesthetic concerns. As shown in FIG. 2, for example, first and second pawls 30 are disposed near the front edge and along the lateral sides of the lid 18; and the catches 32 are defined near the front edge and within the lateral sides of the compartment 26.

In the illustrated embodiment, the hinge 28 is coaxially aligned with and biased towards the open condition (FIG. 2b) by at least one actuating spring 34, such that upon disengagement of the pawls 30 and catches 32, the console lid 18 is forced to pivot about an axis, p, defined thereby due to the force of the spring 34. More preferably, a helical torsion spring 34 is employed to minimize packing requirements. The rotation of the lid 18 is preferably halted by a stop 36 coupled to either the lid 18 or compartment 26, so as to prevent over-extension to the lid 18 (FIG. 2b). It is appreciated that the stop 36 may be integrally formed with the lid 18. The lid 18 may be manually closed by overpowering the spring 34, so that the pawls 30 re-engage the catches 32 (with the actuator 14 in the deactivated and cooled condition). Alternatively, an active material actuator 14 may be employed to produce a moment about the hinge axis, or a torsional actuator such as an SMA torque drive (not shown) may be employed.

Figure 3A:
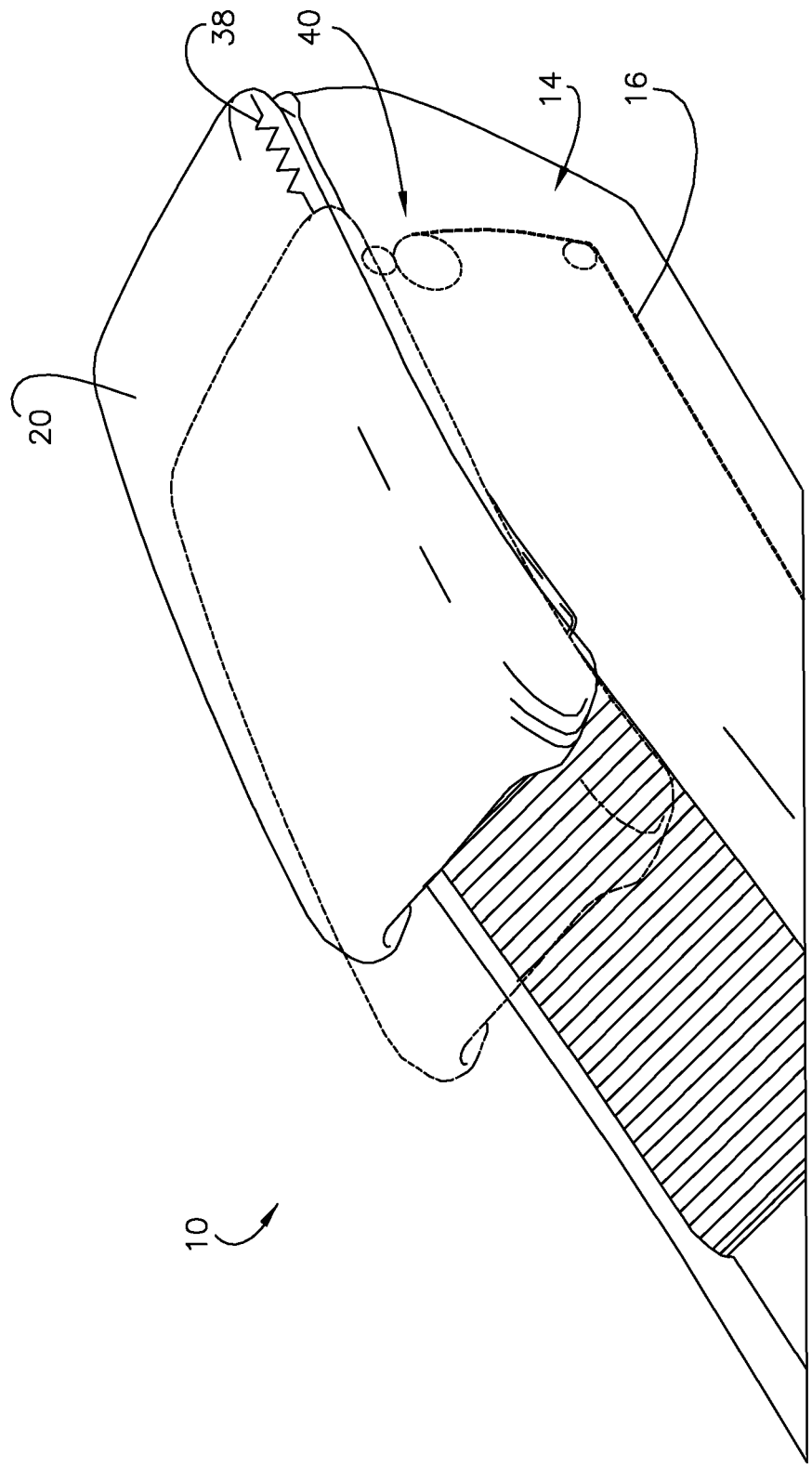
FIG. 3a is a perspective view of a center console including a translatable armrest in fore and aft (shown in hidden-line type) positions, and an active material actuator drivenly coupled to the armrest and further including a return spring and gear transmission used to provide mechanical advantage, in accordance with a preferred embodiment of the invention.
Figure 3B:
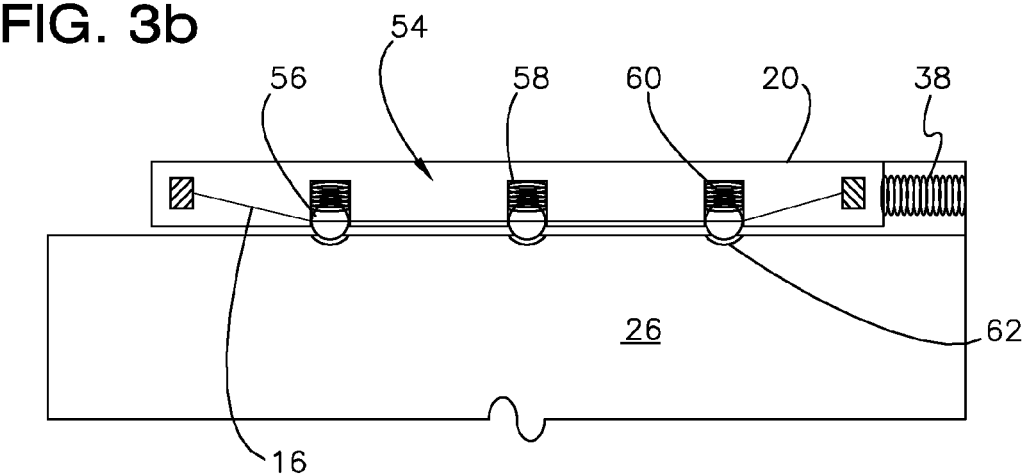
FIG. 3b is a side elevation of a center console having a translatable armrest and an SMA released detent system operable to maintain the armrest in a plurality of discreet translated positions, in accordance with a preferred embodiment of the invention.
Figure 3C:
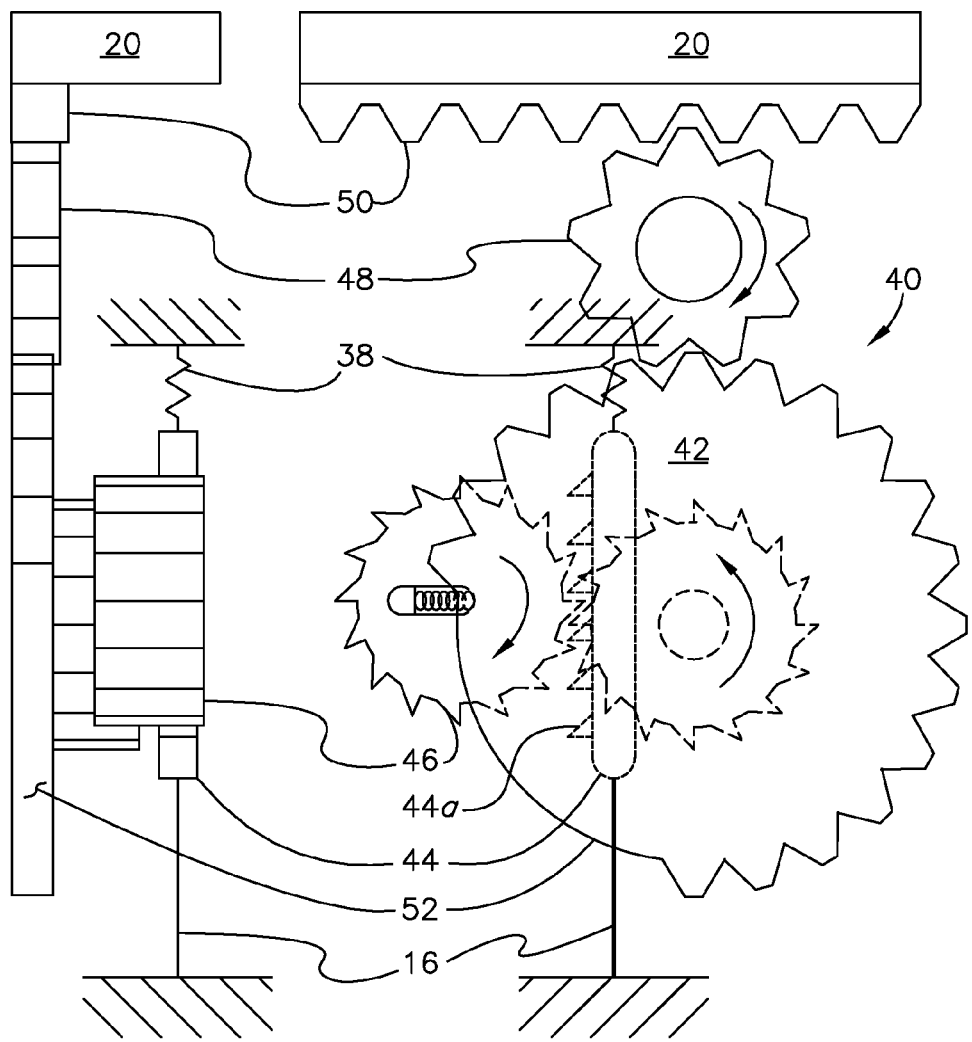
FIG. 3c presents front and side elevations of a multi-gear and rack transmission drivenly coupling an active material actuator and armrest, in accordance with a preferred embodiment of the invention.

As shown in FIGS. 3a-c, another embodiment of the console 10 concerns the aforementioned armrest 20 slidably coupled to the lid 18 and/or compartment 26. The armrest 20 is preferably coupled to an active material actuator 14 operable, upon activation, to drive the armrest 20 towards one or more adjusted positions. Where the actuator 14 presents a contracting tensile element, such as the illustrated SMA wire 16, it is appreciated that the inability of the element 16 to carry a compressive load enables the armrest 20 (and other components 12) to be manually manipulated, by causing slack in the element 16 in lieu of contraction. A return spring 38 coupled to the armrest 20 preferably returns the armrest 20 to the original position upon cessation of the activation signal.

More preferably, to drive the armrest 20, the actuator 14 (e.g., SMA wire 16) is coupled to a gear transmission 40 configured to magnify displacement. For example, upon activation, a one-way driving gear 42 may be driven by a rack 44 through a one-way intermediary 46; the intermediary 46 being biased towards engagement with the rack 44 and the driving gear 42 (FIG. 3c). The rack 44 is drivenly coupled to the actuator 14 (e.g., SMA wire 16) and a return spring 38, which together work antagonistically to produce a ratcheting action. That is to say, the rack 44 defines a plurality of sloped teeth 44a (FIG. 3c) that, when translated in a first direction, causes the engaged intermediary to rotate, and, when translated in the opposite direction, pushes the intermediary 46 outwardly, so as to be disengaged. The intermediary 46 presents sufficient depth, such that it concurrently engages and disengages the rack 44 and driving gear 42. Causing the engaged intermediary 46 to rotate drives the driving gear 42, which in turn drives a driven gear 48. Finally, the driven gear 48 drives a horizontal rack 50 fixedly attached to the armrest 20.

The gears 42, 46, 48 are preferably configured such that the displacement caused by the element 16 is amplified to achieve a desired, predetermined distance or "stroke." In FIG. 3b, the return spring 38 opposes the displacement of the armrest 20 and stores energy when the armrest 20 translates to an adjusted position. The inability for the driving and intermediary gears 42, 46 to rotate in the opposite direction locks the armrest 20 in the adjusted position. To enable the armrest 20 to return, the driving gear 42 preferably includes a sector 52 absent teeth (or "bald spot"). After a predetermined number of activations, the driven gear 48 encounters the sector 52 and becomes free to rotate in the non-driven direction at the urging of the return spring 38. The armrest 20 is caused to return to the home position (e.g., one of fore and aft positions shown in FIG. 3a). The sector 52 presents an angular displacement based upon the gear ratio and desired stroke length per activation cycle, so as to be encountered periodically, wherein the period is equivalent to the number of positions to be achieved.

More preferably, the console 10 includes a plurality of driving gears 42, which along with the driven gear 48, presents differing gear ratios. A second actuator (not shown) or a manual mechanism causes a gear shift to a second driving gear 42, so that the displacement caused by element 16 is modified to achieve another predetermined stroke. Multiple stroke lengths can be achieved by selecting one of a plurality of actuators 14 (e.g., SMA wires of differing lengths) instead of alternate gears 42. Finally, it is also appreciated that exposing the element 16 to differing activation signals and/or over differing activation periods may also cause the stroke length to be modified.

Alternatively, the actuator 14 may be used to release the armrest 20, so as to enable manual manipulation. In this configuration, for example, the console 10 may further comprise a locking mechanism (e.g., latch, detent, etc.) 54 that holds the armrest 20 in discreet predetermined stroke positions, as shown in FIG. 3b. Here, at least one ball bearing 56 is situated in a longitudinal hole 58 defined by the armrest 20 (or compartment 26). A detent spring 60 forces the bearing 56 into one of several shallow depressions 62 formed in the other of said armrest 20 or compartment 26. This holds the armrest 20 in a fixed position relative to the compartment 26, even when the element 16 has been cooled and the return spring 38 caused to store energy.

Translation of the armrest 20 caused by the actuator 14 is preferably sufficient to overcome the detent spring 60 and dislodge the ball bearing 56 from the depression 62. In that sense, it is appreciated that a single actuator 14 may be used to first release the locking mechanism 54 and then manipulate the component 12. Alternatively, a separate actuator 14, such as a bow-string SMA wire entrained within holes defined by the bearings 56 (FIG. 3b) may be activated so as to release the detent. Here, the wire 16 and signal are cooperatively configured to present a brief (e.g., 1-2 sec) period, so that after adjustment, each ball bearing(s) 56 is forced into another depression 62 by the associated spring 58.

Figure 4:
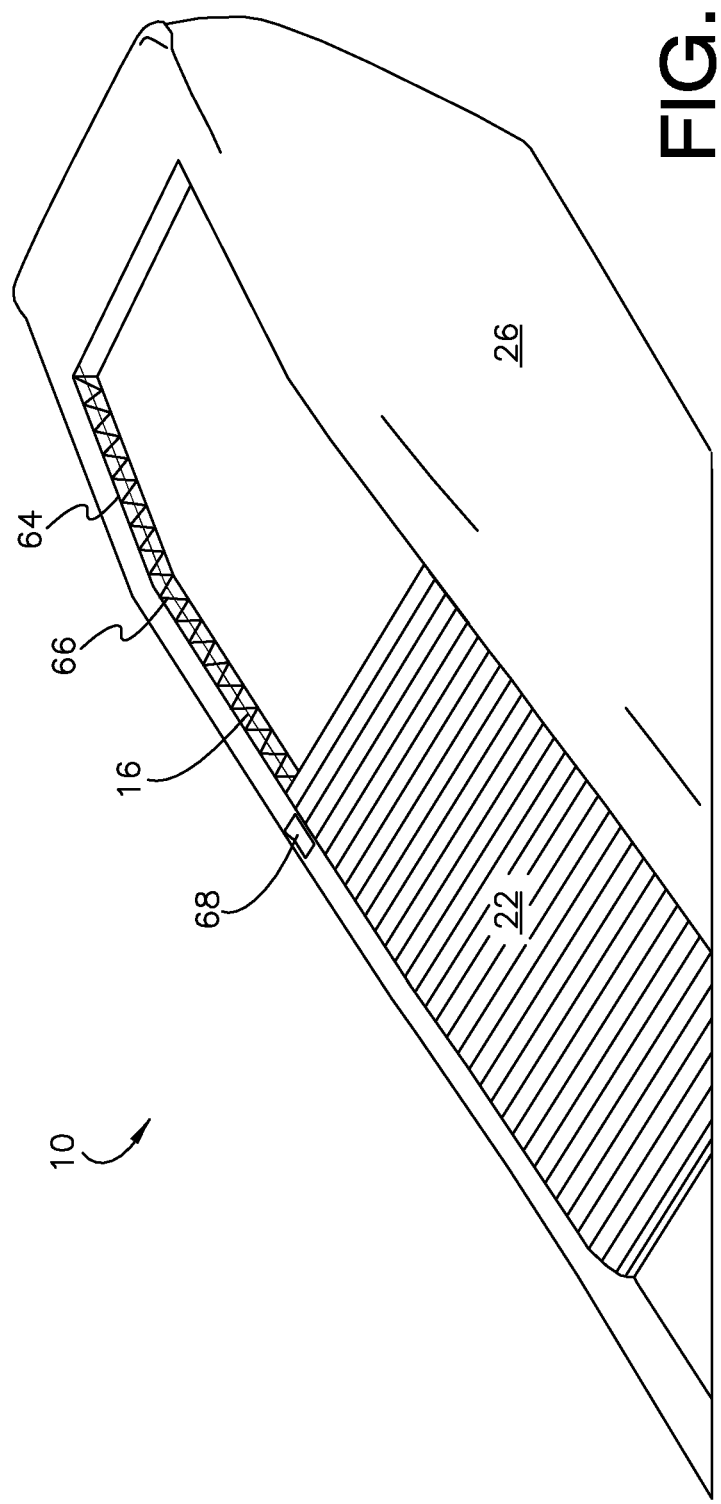
FIG. 4 is a perspective view of a console having a sliding tambour door that translates within lateral track, and an active material actuator and antagonistic spring drivenly coupled to the door, in accordance with a preferred embodiment of the invention.

Another embodiment is shown in FIG. 4, wherein the component 12 includes a tambour style door 22 operable to selectively enclose a storage compartment 26. In the illustrated example, the door 22 is entrained within a plurality of lateral tracks 64 defined by the compartment 12 and wound about a lower spool (not shown) to achieve open and closed conditions. An actuator 14 (e.g., a shape memory alloy wire 16) nests inside at least one track 64 and is drivenly coupled to the door 22. When the wire 16 is activated, the door 22 is caused to unwind so as to cover the storage space of the compartment 26. Thus, here, as throughout the disclosure, it is appreciated that the wire 16 is of sufficient length, constitution, and diameter, to effect the intended displacement. The door 22 may be caused to open (or downwardly scroll) by gravitational forces, a torsional spring (also not shown) engaging the spool, or a spring 66 coaxially aligned with the wire 16 in the track 64 (FIG. 4). A retractable door stop 68 is optionally positioned along the track 64 to limit access to the storage compartment 26, and more preferably, the stop 68 is slidable between fully opened, and closed positions, wherein with respect to the latter, the stop 68 acts as a locking mechanism that retains the door 22 in the closed condition, after the wire 16 cools.

Figure 5A:
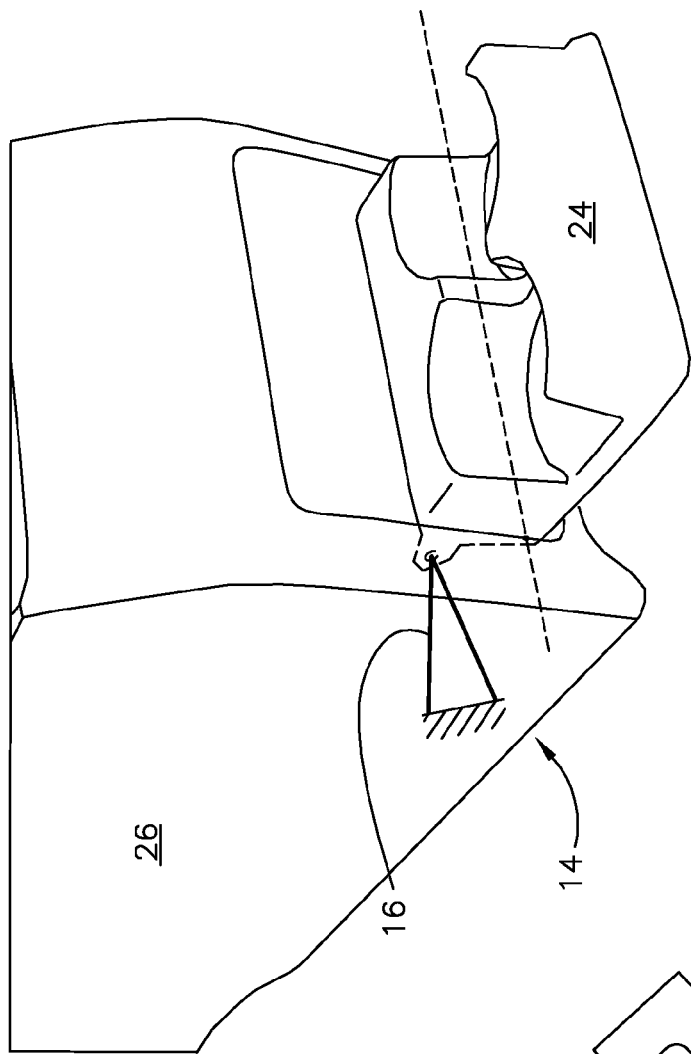
FIG. 5a is a perspective view of a center console including a pivotal cup-holder drivenly coupled to an active material actuator, in accordance with a preferred embodiment of the invention.
Figure 5B:
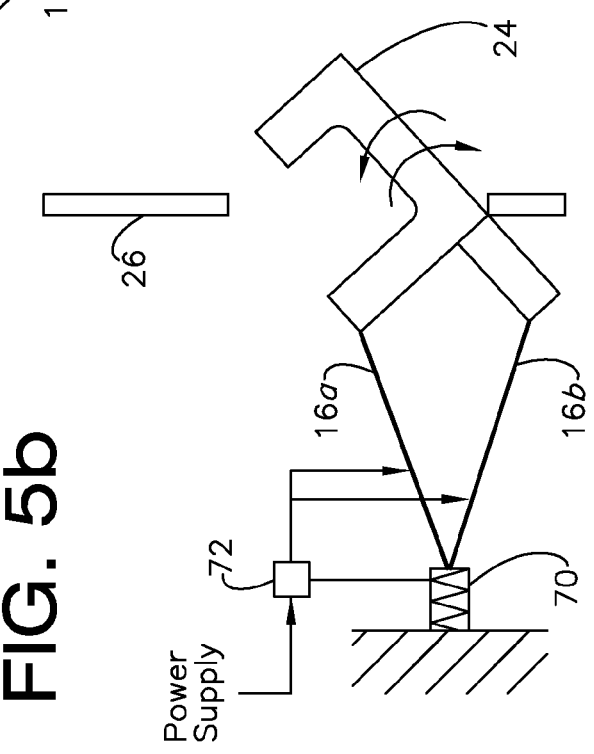
FIG. 5b is a cross-sectional elevation of a console depicting a cup holder pivotal about an axis, and including first and second active material actuators antagonistically driven to the cup-holder, so as to cause the cup holder to achieve open and closed conditions respectively, and a strain relief mechanism including a power supply cut-off, in accordance with a preferred embodiment of the invention.

FIGS. 5a,b show yet another exemplary embodiment, wherein the component 12 is a selectively deployed cup holder 24. In the illustrated embodiment, the cup holder 24 is pivotally coupled to the console compartment/housing 26 so as to define an axis, p. An active material actuator 14 is coupled to the console 10 and preferably includes a plurality of active material elements 16. As shown in FIG. 5b, at least one element 16a may be operable to cause a clockwise rotation about the axis p, and at least one element 16b may be drivenly coupled to the cup holder 24, so as to create a counterclockwise rotation about the axis p, corresponding to opening and closing. Alternatively, it is appreciated that manual manipulation may supplant either actuator. Here, also, a locking mechanism (e.g., latch, detents, snaps, etc.) may be provided to retain the cup holder in the closed condition, and overcome by the opening actuation force.

In this and throughout the embodiments, a strain relief mechanism 70 (FIG. 5b) is preferably coupled between the wire 14 and compartment 26 (or fixed structure) and presents a secondary work output path when the actuator 14 is activated and the component 12 (e.g., cup holder 24) is unable to move. For example, an extension spring and mechanically advantageous lever (not shown) may be utilized, as applied in other SMA applications. More preferably, the relief mechanism 70 also activates a cutoff switch 72 (FIG. 5b) that interrupts the signal from the power supply and ceases activation of the wire 16. Finally, it is appreciated that an input device (e.g., a push button, sliding gauge, wheel, touch screen, microphone, etc.) or sensor 74 (FIG. 1) may be communicatively coupled to the actuator 14, such that when information is received or detected, the actuator 14 is caused to manipulate the component 12.

Ranges disclosed herein are inclusive and combinable (e.g., ranges of "up to about 25 wt %, or, more specifically, about 5 wt % to about 20 wt %", is inclusive of the endpoints and all intermediate values of the ranges of "about 5 wt % to about 25 wt %," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

Suitable algorithms, processing capability, and sensor inputs are well within the skill of those in the art in view of this disclosure. This invention has been described with reference to exemplary embodiments; it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out this invention, but that the invention will include all embodiments falling within the scope of the appended claims.

What is claimed is:

1. A manipulable center console adapted for use in a vehicle, said console comprising:
   a manipulable structural center console component;
   a one-way shape memory alloy (SMA) wire actuator operable to undergo a reversible change in fundamental property when exposed to or occluded from an activation signal, so as to be activated and deactivated respectively, and operatively coupled to the component;
   a spring-biased pawl intermediately coupled to the component and the one-way SMA wire actuator; and
   a catch defined in a compartment coupled to the component, the catch to lockingly engage the spring-biased pawl when the component is in a closed condition;
   wherein when the one-way SMA wire actuator is activated, the one-way SMA wire actuator disengages the spring-biased pawl from the catch to manipulate the component into an open condition.

2. The console as claimed in claim 1, wherein the manipulable component is selected from the group consisting of a translatable top cover, a rollable top cover, a sliding armrest, a pivotal cup holder, a translatable cupholder, a sliding tambour door, a pivotal console lid, a reconfigurable interior compartment panel, and a translatable center console in the entirety.

3. The console as claimed in claim 1, wherein the component is drivenly coupled to a stored energy element, the stored energy element is retained in a stored state when the spring-biased pawl is lockingly engaged, and the stored energy element is enabled to manipulate the component as a result of disengaging the spring-biased pawl.

4. The console as claimed in claim 3, wherein the stored energy element is a spring drivenly coupled to the component.

5. The console as claimed in claim 4, wherein the component is a pivotal lid, the lid defines a pivot axis, and the stored energy element is a torsion spring coaxially aligned with the axis and is in the stored state when the lid is closed.

6. The console as claimed in claim 1, further comprising:
   an input device communicatively coupled to the one-way SMA wire actuator, and operable to receive an input, wherein the input device and the one-way SMA wire actuator are cooperatively configured to manipulate the component only when the input is received.

7. The console as claimed as claim 6, wherein the input device is selected from the group consisting of a push button, sliding gauge, wheel, touch screen, and microphone.

* * * * *